S. H. SMITH.
Draft Equalizer.
No. 87,305.
Patented Feb. 23, 1869.
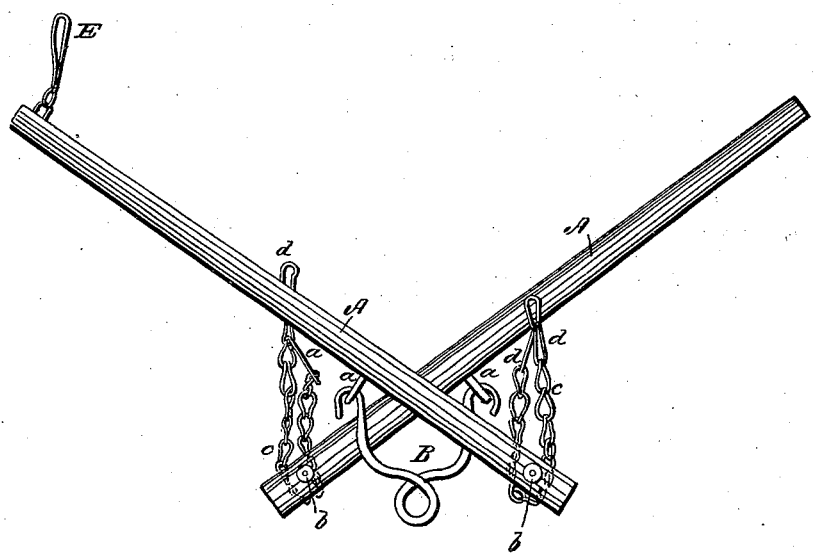
Witnesses:
Cornelius Cox
Leopold Everts
Inventor:
Seth H. Smith
per Alexander & Mason
Attys

SETH H. SMITH, OF NORTH ADAMS, MICHIGAN.

Letters Patent No. 87,305, dated February 23, 1869.

IMPROVED DRAUGHT-EQUALIZER.

The Schedule referred to in these Letters Patent and making part of the same.

*To all whom it may concern:*

Be it known that I, SETH H. SMITH, of North Adams, in the county of Hillsdale, and in the State of Michigan, have invented certain new and useful Improvements in Draught-Equalizer; and do hereby declare that the following is a full, clear, and exact description thereof, reference being had to the accompanying drawings, and to the letters of reference marked thereon.

The nature of my invention consists in the construction and arrangement of a "draught-equalizer for three horses," which does away with the single whiffle-trees, and operates so that, in turning, the horses cannot get out of the traces.

In order to enable others skilled in the art to which my invention appertains, to make and use the same, I will now proceed to describe its construction and operation, referring to the annexed drawings, which form a part of this specification, and which are a plan view of the equalizer.

A A represent two shafts, of length suitable to the size of the horses, and are turned strong enough for two traces in one end, and one at the other.

About one-third of the distance from the thicker end is a hook or eye, *a*, placed, in which the bail B hooks.

The bail is made with one end bent down, and the other up, so as to leave each shaft free to move back or forward.

The shafts A A cross each other, but in the drawings I have shown them as crossing each other more than they actually do while in use.

The thick or short end of each shaft is provided with a pulley, *b*, around which is passed a chain, *c*, of suitable length, which has a hook, *d*, at each end The centre horse is hitched to the inner hook *d*, from each shaft, and the side horses to the outer hook *d*, and to a hook, *e*, at the outer or longer end of the shaft.

It will thus be seen that all the horses are hitched to both of the shafts A A.

By this arrangement the horses are brought closer to the plow, and the two shafts, crossing each other, and held by the bail, leave either outer end free to be lifted up to pass stumps or other obstructions, and are not stiff like a long evener. The plow is therefore held easier by the operator.

If the centre horse should be hitched closer or wider than desired, it can be easily changed by widening or narrowing the bail.

Having thus fully described my invention,

What I claim as new, and desire to secure by Letters Patent, is—

1. A three-horse draught-equalizer, when formed of two shafts, crossing each other, and arranged to operate substantially as shown and described.

2. The combination of the shafts A A, bail B, pulleys *b b*, chains *c c*, and hooks *d d* and *e e*, all constructed and operating substantially as and for the purposes herein set forth.

In testimony that I claim the foregoing, I have hereunto set my hand, this 7th day of September, 1868.

SETH H. SMITH.

Witnesses:
SAMUEL M. SMITH,
ALBERT B. BUCK.